US008406911B2

(12) United States Patent
Limaye et al.

(10) Patent No.: US 8,406,911 B2
(45) Date of Patent: Mar. 26, 2013

(54) IMPLEMENTING SEQUENTIAL SEGMENTED INTERLEAVING ALGORITHM FOR ENHANCED PROCESS CONTROL

(75) Inventors: Shreyas Subhash Limaye, San Jose, CA (US); Andrew Crehan Walker, Carmel, CA (US); Yeheyis Workeneh, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 224 days.

(21) Appl. No.: 12/837,910

(22) Filed: Jul. 16, 2010

(65) Prior Publication Data

US 2012/0016499 A1 Jan. 19, 2012

(51) Int. Cl.
*G06F 19/00* (2011.01)

(52) U.S. Cl. ........ 700/108; 700/153; 700/276; 700/299; 438/14

(58) Field of Classification Search .................. 700/108, 700/153, 276, 299; 438/14
See application file for complete search history.

(56) References Cited

U.S. PATENT DOCUMENTS

| 6,230,069 | B1 | 5/2001 | Campbell et al. |
| 6,444,481 | B1 | 9/2002 | Pasadyl et al. |
| 6,449,524 | B1 | 9/2002 | Miller et al. |
| 6,577,914 | B1 | 6/2003 | Bode |
| 6,587,744 | B1 * | 7/2003 | Stoddard et al. ............. 700/121 |
| 6,631,299 | B1 | 10/2003 | Patel et al. |
| 7,005,306 | B1 | 2/2006 | Poris |
| 7,075,094 | B2 | 7/2006 | Feldbaum et al. |
| 7,158,851 | B2 | 1/2007 | Funk |
| 7,269,526 | B2 * | 9/2007 | Muro et al. ..................... 702/84 |
| 7,324,865 | B1 * | 1/2008 | Sonderman et al. .......... 700/121 |
| 7,337,019 | B2 * | 2/2008 | Reiss et al. .................... 700/21 |
| 7,403,832 | B2 | 7/2008 | Schulze et al. |
| 7,642,102 | B2 * | 1/2010 | Funk et al. ....................... 438/14 |
| 2004/0036838 | A1 * | 2/2004 | Podoleanu et al. ........... 351/206 |
| 2005/0128888 | A1 * | 6/2005 | Hosokawa et al. ........ 369/13.54 |
| 2006/0265162 | A1 * | 11/2006 | Muro et al. ..................... 702/84 |
| 2008/0183412 | A1 * | 7/2008 | Funk et al. ...................... 702/97 |
| 2009/0000950 | A1 * | 1/2009 | Ortleb et al. .................... 205/84 |

FOREIGN PATENT DOCUMENTS

JP 2005276060 10/2005

OTHER PUBLICATIONS

D. S. Bang et al, "A Multiple Target Sputter System with Enhanced Wafer Uniformity, Lifetime Uniformity, and Wafer Scaleablilty", pp. 549-552, IEDM Tech. Dig., 1994, IEEE.
Moshe Sarfaty et al. "Advance Process Control Solutions for Semiconductor Manufacturing", pp. 101-106, 2002 IEEE/Semi Advanced Semiconductor Manufacturing Conference, IEEE.
Taber H. Smith et al., "Run by Run Advanced Process Control of Metal Sputter Deposition", pp. 276-284, IEEE Transactions on Semiconductor Manufacturing, vol. 11, No. 2, May 1998.
Jingang Yi et al. "A Run-to-Run Film Thickness Control of Chemical-Mechanical Planarization Processes", pp. 4231-4236, 2005 American Control Conference, Jun. 8-10, 2005.

* cited by examiner

*Primary Examiner* — Mohammad Ali
*Assistant Examiner* — Anthony Whittington
(74) *Attorney, Agent, or Firm* — Joan Pennington

(57) ABSTRACT

A method and apparatus are provided for implementing Advanced Process Control (APC) for enhanced electrical, magnetic, or physical properties process output control using a sequential segmented interleaving algorithm. The sequential segmented interleaving algorithm includes two tuning equations running in parallel. A deposition time is calculated after a production run based upon the relationship between the electrical, magnetic, or physical properties process output and deposition time process input. A deposition rate offset value is calculated after a calibration run based upon the relationship between a calibration deposition thickness process output and an updated deposition time process input calculated after a last production run.

20 Claims, 7 Drawing Sheets

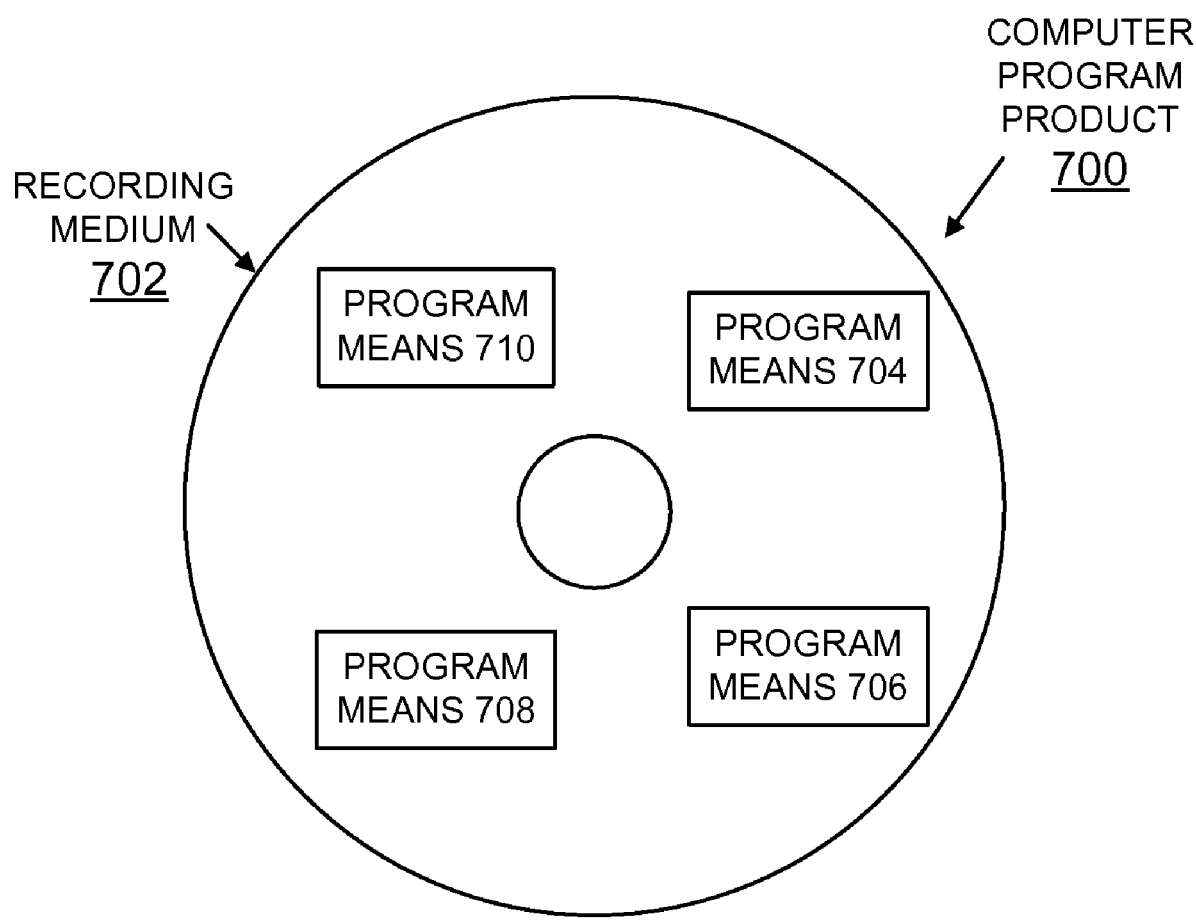

IMPLEMENTING SEQUENTIAL SEGMENTED INTERLEAVING ALGORITHM FOR ENHANCED PROCESS CONTROL

FIELD OF THE INVENTION

The present invention relates generally to the data storage field, and more particularly, relates to a method and apparatus for implementing Advanced Process Control (APC) for enhanced magnetic properties process output control using a sequential segmented interleaving algorithm.

DESCRIPTION OF THE RELATED ART

U.S. Pat. No. 6,230,069 issued May 8, 2001 to Campbell et al., discloses a system and method for controlling the manufacture of semiconductor wafers using model predictive control. In accordance with one embodiment, a tool output of the manufacturing tool is determined based on a first wafer run. Using the tool output, a tool input for a subsequent wafer run is determined by minimizing an optimization equation being dependent upon a model which relates tool output to tool process state and tool process state to tool input and previous tool process state. The tool input is then provided to the manufacturing tool for processing a second wafer run. In this manner, processing by the tool or tool age is taken into account in determining the tool input for a subsequent run. This can reduce variations in tool output from run-to-run and improve the characteristics of the ultimately formed semiconductor devices. The tool may, for example, be a chemical mechanical polishing tool with the tool input being polishing time and the tool output being a post-polish wafer layer thickness associated with CMP tool for a run.

U.S. Pat. No. 7,324,865 issued Jun. 29, 2008 to Sonderman et al., discloses a method comprising monitoring consumption of a sputter target to determine a deposition rate of a metal layer during metal deposition processing using the sputter target, and modeling a dependence of the deposition rate on at least one of deposition plasma power and deposition time. The method also comprises applying the deposition rate model to modify the metal deposition processing to form the metal layer to have a desired thickness.

SUMMARY OF THE INVENTION

A principal aspect of the present invention is to provide a method and apparatus for implementing Advanced Process Control (APC) for enhanced Advanced Process Control (APC) for enhanced magnetic properties process output control using a sequential segmented interleaving algorithm. Other important aspects of the present invention are to provide such method and apparatus substantially without negative effect and that overcome some of the disadvantages of prior art arrangements.

In brief, a method and apparatus are provided for implementing Advanced Process Control (APC) for enhanced magnetic properties process output control using a sequential segmented interleaving algorithm. The sequential segmented interleaving algorithm includes two tuning equations running in parallel. A deposition time is calculated after a production run based upon the relationship between the magnetic properties process output and deposition time process input. A deposition rate offset value is calculated after a calibration run based upon the relationship between a calibration deposition thickness process output and an updated deposition time process input.

BRIEF DESCRIPTION OF THE DRAWINGS

The present invention together with the above and other objects and advantages may best be understood from the following detailed description of the preferred embodiments of the invention illustrated in the drawings, wherein:

FIG. 7 is a block diagram illustrating a computer program product in accordance with embodiments of the invention.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
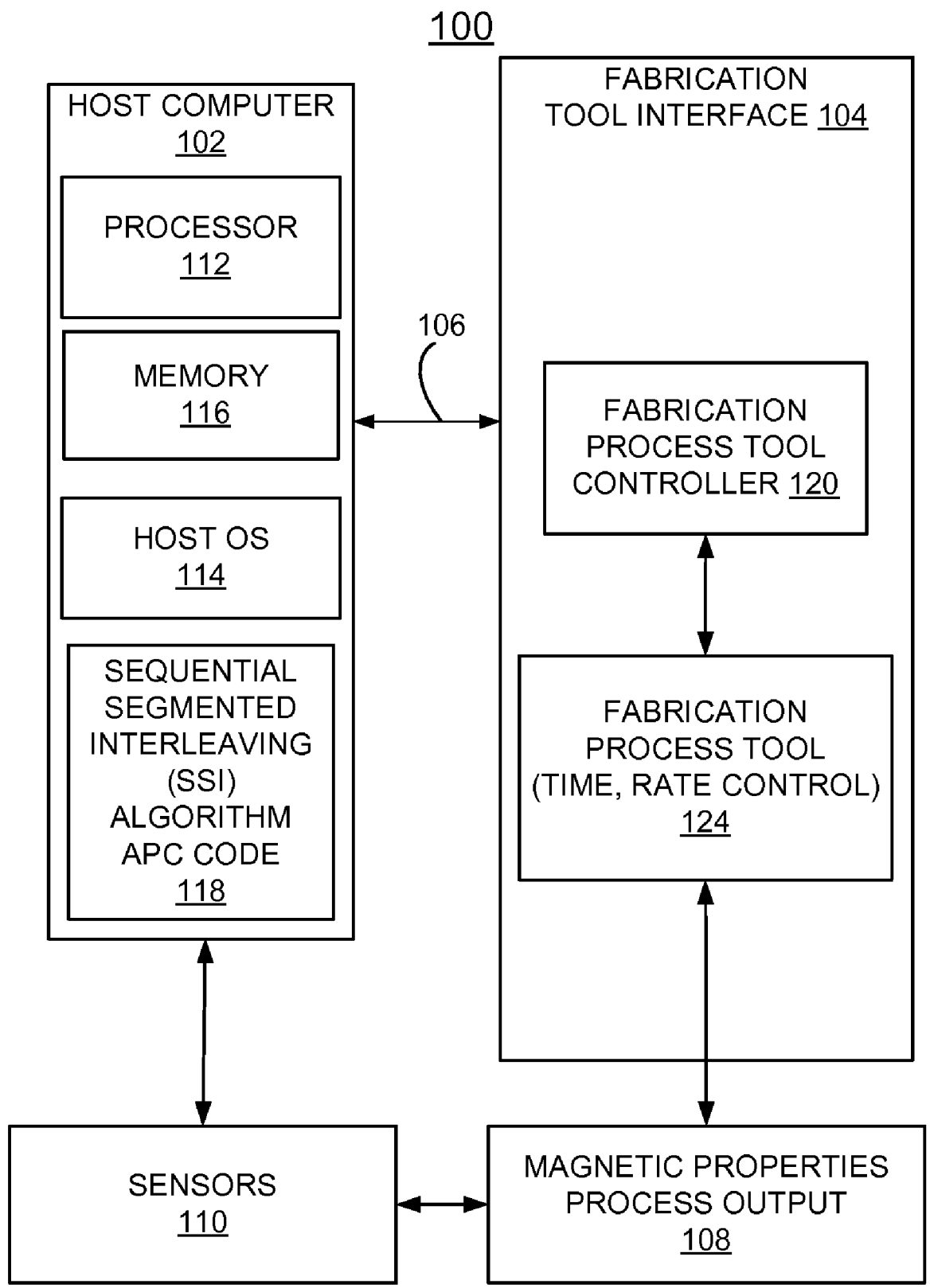
FIG. 1 is a block diagram representation illustrating a system for implementing Advanced Process Control (APC) for enhanced magnetic properties process output control using a sequential segmented interleaving algorithm in accordance with an embodiment of the invention.

Having reference now to the drawings, in FIG. 1, there is shown an example system for implementing Advanced Process Control (APC) for enhanced magnetic properties process output control using a sequential segmented interleaving algorithm generally designated by the reference character 100 in accordance with an embodiment of the invention. System 100 includes a host computer 102 and a fabrication tool interface 104 and an interface 106 between the host computer 102 and the fabrication tool interface 104. System 100 includes a magnetic properties process output 108 coupled to the fabrication tool interface 104 and to a plurality of sensors 110 for monitoring predefined parameters, such as calibration layer deposition thickness, and production run deposition values.

As shown in FIG. 1, host computer 102 includes a processor 112, a host operating system 114, a memory 116 and sequential segmented interleaving (SSI) algorithm Advanced Process Control (APC) code 116 in accordance with embodiments of the invention. The fabrication tool interface 104 includes a fabrication process tool controller 120 coupled to the host computer 102 and a fabrication process tool 124 providing time and rate control inputs, such as deposition time and deposition rate input parameters for maintaining a desired target output value for the magnetic properties process output 108 in response to tuning control provided by the SSI algorithm APC code 116.

In accordance with features of the invention, in a hard bias deposition process, quality of the output 108 is judged by the magnetic properties including retentivity, and sheet resistance exhibited by a wafer after completion of the process.

These magnetic properties depend on the deposition thickness where retentivity (Mr) depends upon a thickness of a hard bias material layer, such as a Cobalt and Platinum (CoPt) thickness and where sheet resistance (sheet Rho) depends upon a thickness of a soft-magnetic material layer, such as a Rhodium (Rh) thickness across the hard bias deposition process or all recipes. Hence the tuning algorithms developed for the hard bias process improve the output by adjusting the deposition thickness from run-to-run. Deposition thickness depends upon two input parameters of deposition time and deposition rate. A conventional tuning algorithm assumes the deposition rate to be constant and consequently calculates the deposition time in order to adjust the deposition thickness.

In reality, the deposition rate is not constant over time. A single layer calibration run is performed, at a set time interval, such as every 36 hours, in order to evaluate the current value of the deposition rate. Typically production runs are performed continuously one after the other for the set time interval or 36 hours. Based on the magnetic properties exhibited by the previous run, the APC tuning algorithm adjusts the target value of the deposition thickness and the deposition time for the next run. This algorithm works fine until the 36 hour time-limit is reached since the deposition rate remains constant until a single layer calibration is performed. However, a single layer calibration can change the deposition rate by a random amount. Current run-to-run tuning algorithms do not account for fluctuations in the deposition rate occurring after layer calibration runs performed every 36 hours. Currently, depending upon the amount of deposition rate change, for a production run performed immediately after a single layer calibration, the existing algorithm has a potential to yield less than optimal quality.

The sequential segmented interleaving (SSI) algorithm of the invention removes this drawback. The SSI algorithm accounts for changes in the deposition rate change after single layer calibration runs. An immediate advantage of the invention is that the SSI algorithm makes manufacturing confident about the quality of each and every production run without having to worry about the effect of layer calibration runs. Also in the general manufacturing context, the SSI algorithm improves the run-to-run tuning in all those cases where routine maintenance changes input parameters that are otherwise constant.

In accordance with features of the invention, the sequential segmented interleaving (SSI) algorithm can account for random fluctuations occurring regularly in other process parameters, such as deposition rate in this case, while limiting the maximum amount of adjustment of the main parameter, such as deposition time in this case, to a predetermined level.

Description of the Basic Tuning Algorithm Implementation

A first data analysis step of implementing an APC tuner is to collect and analyze relevant data to confirm the relationship between the input and output parameters, or the deposition thicknesses and the respective magnetic properties in this case. The data is collected by changing the CoPt and Rh thickness values slightly, running the process for a few runs with the changed values and collecting the Mr and sheet Rho values for these runs. Since the data is being collected on an actual running process, changes in the thickness values were obviously limited.

Analysis of the collected data shows linear fits between average deposition thickness values and the corresponding magnetic properties. The adjusted R-square values are greater than 0.95 showing a statistically significant fit. Moreover the t-values for the CoPt thickness and Rh thickness are lower than 0.05. Therefore, from the data, CoPt thickness and retentivity appear directly proportional to each other, whereas Rh thickness and sheet Rho appear inversely proportional to each other. Based upon this analysis and the linear relationships between deposition thicknesses and magnetic properties, the tuner equation is set up as follows.

Set-Up Tuner Equation

The collected data shows strong correlation between deposition thickness values and magnetic properties. By controlling the deposition thickness values, it is possible to control the process output.

The relationship in case of both Mr and Sheet Rho is linear corresponding to Y=m. X+C, or where Magnetic Output=Slope*Input parameter+Offset.

Retentivity=Retentivity Slope*CoPt Thickness+Retentivity Offset;

Sheet Rho=Sheet Rho Slope*Rh Thickness+Sheet Rho Offset.

The data analysis provides the values for the constant terms of the slopes and offsets, using collected data.

The input 'Deposition Thickness' has two components including
Deposition Time and Deposition Rate, where Deposition Thickness=Deposition Time*Deposition Rate Of these components, deposition rate in general is known to decrease over a period of time. Therefore, in the hard bias process, for every tool and every process recipe a layer calibration run is performed every 36 hours to calibrate the deposition rate. The APC software can calculate the deposition rate after a single layer calibration based on the deposition thickness and the deposition time for the layer calibration run. This deposition rate in existing arrangements remains unchanged for all the production runs until the next layer calibration.

Hence deposition rate remains constant between two successive layer calibrations. Therefore, adjusting only the deposition time from run-to-run can effectively control the deposition thickness. The basic tuning algorithm to control magnetic properties by controlling deposition thickness as the input parameter is as follows:

Output Offset$_{(n+1)}$=Actual Output$_{(n)}$−(Slope*Dep. Rate*Dep. Time$_{(n)}$)   a.

Deposition Thickness$_{(n+1)}$=(Target Output−Output Offset$_{(n+1)}$)/Slope   b.

Deposition Time$_{(n+1)}$=Deposition Thickness$_{(n+1)}$/Deposition Rate.   c.

After every production run, the tuning algorithm calculates Offset value for the next run as shown in the above step 'a' and the APC software stores that calculated Offset value.

Figure 2:
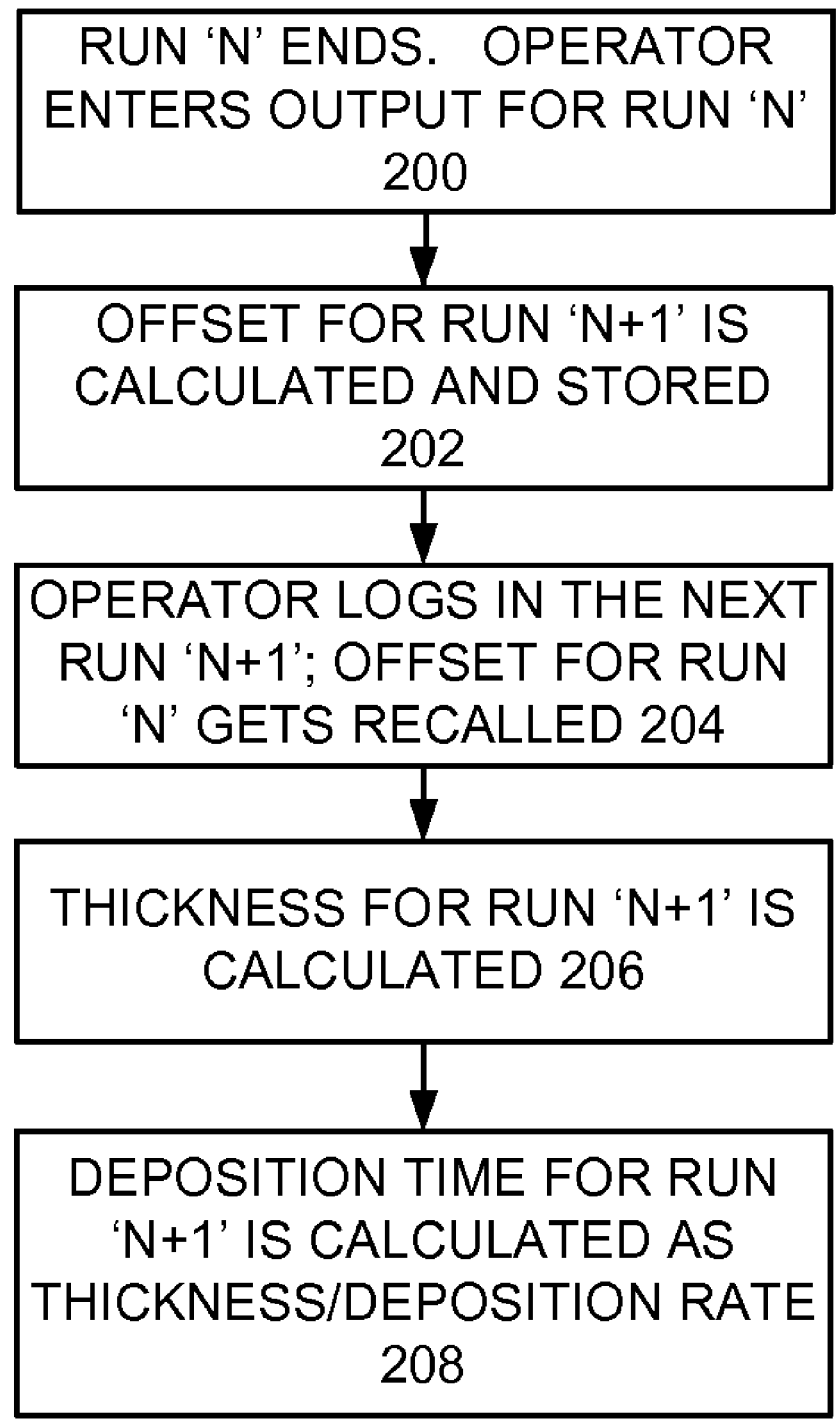
FIGS. 2, 3, 4, 5, and 6 are flow charts illustrating example operations of the system of FIG. 1 in accordance with embodiments of the invention.

Referring now to FIG. 2, example operations are shown for the basic algorithm that tunes the deposition time for run (N+1) based on the magnetic output for run (N). As indicated at a block 200, when run 'N' ends, an operator enters output for run 'N'. The offset for run 'N+1' is calculated and stored as shown above in step 'a' and as indicated at a block 202. When an operator logs-in the next run, the APC software recalls the saved offset value calculated after the previous run and calculates the Deposition Thickness as shown above in step 'b' and as indicated at a block 206. Since the deposition rate remains constant between the layer calibration runs, the deposition time needs to be adjusted in order to control the deposition thickness. The deposition time is calculated based on the calculated deposition thickness as shown above in step 'c, as indicated at a block 208.

Figure 3:
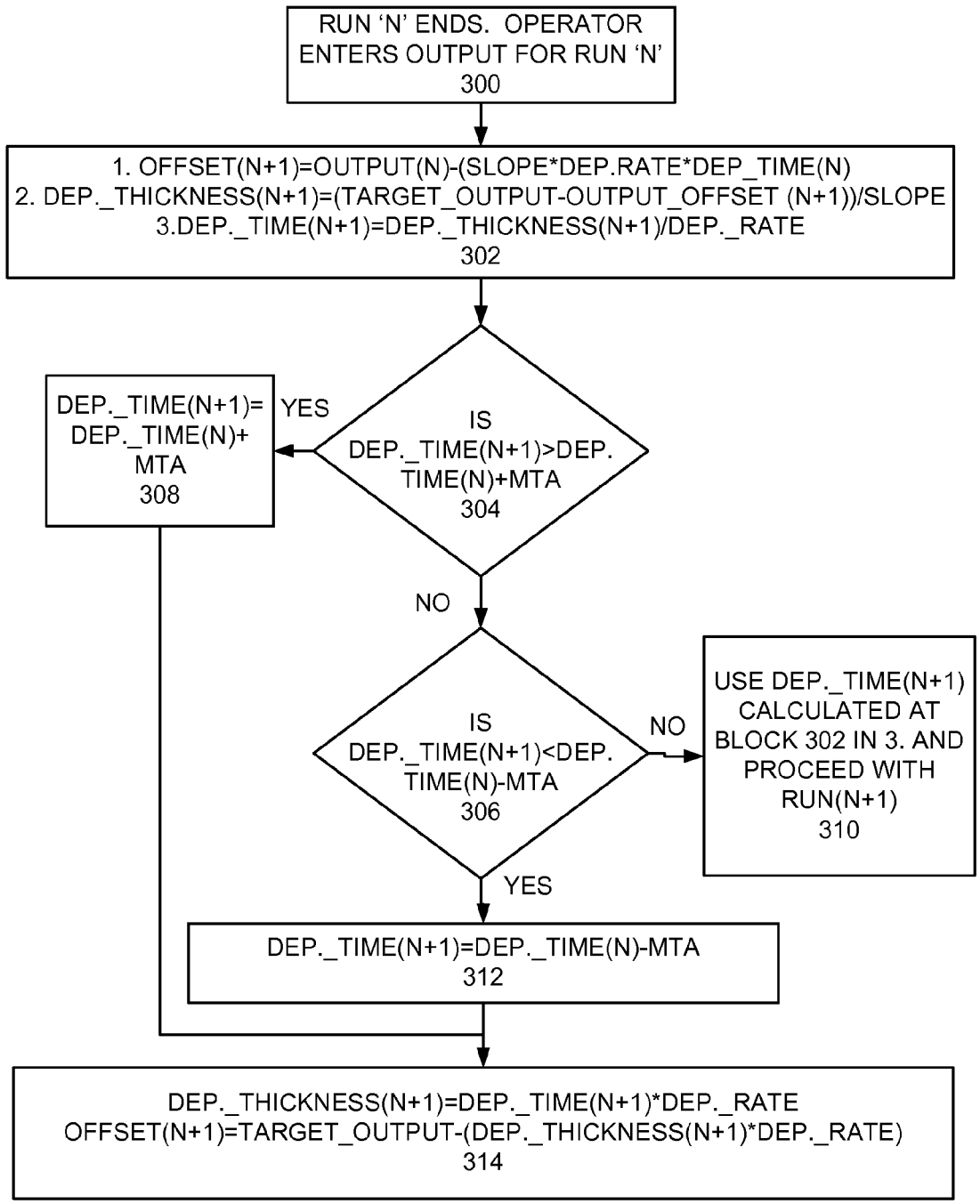

Referring now to FIG. 3, example operations to account for maximum time adjustment (MTA) are shown for the basic algorithm. As indicated at a block 300, when run 'N' ends, an operator enters output for run 'N'. The APC logic shown in FIG. 2 and described above, essentially adjusts the input parameters for the next run based on the output values for the previous run. The problem with this is that one is constantly assuming that barring the controlled variable, all other parameters in the next run behave exactly as the previous run. This assumption is unrealistic, as it does not take into account the existence of random errors and outliers. This could result in wide swings in the input parameters and consequently can increase the batch-to-batch process variability. Although the tuner calculates the difference between actual and target output and targets the output for the next run, random error can cause the actual output to have undesirable variability, and would in fact increase the variability of the process.

In order to avoid wide swings in the deposition time and subsequently in the output, the logic of maximum time adjustment (MTA) is introduced in the tuner. It is meant to ensure that the adjustment in the deposition time for the next run does not exceed a predetermined maximum time adjustment (MTA). The MTA logic adds steps to the basic algorithm as follows:

As indicated at a block 302, the offset (N+1), Deposition (Dep.) thickness, and Dep. Time are calculated as follows:

$$\text{Output Offset}_{(n+1)} = \text{Actual Output}_{(n)} - (\text{Slope} * \text{Dep. Rate} * \text{Dep. Time}_{(n)}) \quad 1.$$

$$\text{Deposition Thickness}_{(n+1)} = (\text{Target Output} - \text{Output Offset}_{(n+1)})/\text{Slope} \quad 2.$$

$$\text{Deposition Time}_{(n+1)} = \text{Deposition Thickness}_{(n+1)}/\text{Deposition Rate} \quad 2.$$

As indicated at decision blocks 304 and 306, checking whether Dep. Time$_{(n+1)}$ > Dep. Time$_{(n)}$+MTA or whether Dep. Time$_{(n+1)}$ < Dep. Time$_{(n)}$−MTA). If determined at decision block 304 that Deposition Time$_{(n+1)}$ is greater than Deposition Time$_{(n)}$+MTA, then Deposition Time$_{(n+1)}$ is set to Deposition Time$_{(n)}$+MTA as indicated at a block 308. If determined at decision block 306 that Deposition Time$_{(n+1)}$ is not less than Deposition Time$_{(n)}$−MTA, then Deposition Time$_{(n+1)}$ is set to the Deposition Time$_{(n+1)}$ is calculated at block 302 in 3, and proceed with the next run (N+1) as indicated at a block 310. Otherwise if determined at decision block 306 that Deposition Time$_{(n+1)}$ is less than Deposition Time$_{(n)}$−MTA, then Deposition Time$_{(n+1)}$ is set to Deposition Time$_{(n)}$−MTA as indicated at a block 312. As indicated at a block 314 the deposition thickness and offset are calculated as follows:

$$\text{Deposition Thickness}_{(n+1)} = \text{Deposition Time}_{(n+1)} * \text{Deposition Rate}$$

$$\text{Output Offset}_{(n+1)} = \text{Target Output} - (\text{Deposition Thickness}_{(n+1)} * \text{Slope}).$$

It is interesting to note that the Deposition Time$_{(n+1)}$ value calculated at one of the blocks 308, 310, 312 and Deposition Thickness$_{(n+1)}$ value calculated at block 314 are not stored in the system. These are merely utilized to calculate the Output Offset$_{(n+1)}$ at block 314, which is stored. There is no need to store the deposition thickness and deposition time values since at the beginning of the next run, these will be calculated using the offset values.

As can be understood from FIG. 3, the MTA logic moderates the adjustment in the input parameter. Thus, in case of a big difference in the actual and target output values, for example, resulting outlier, the MTA logic requires a further number of runs in order to center the process. However, on the other hand, the MTA logic helps for reducing the variability in the input, and consequently reducing the variability in the output. On balance, automatic tuning improves the process centering and hence the need to rapidly improve centering is not too crucial. Whereas dampening the process variation is more important since APC by itself is not be able to recognize outliers and random errors.

Figure 4:
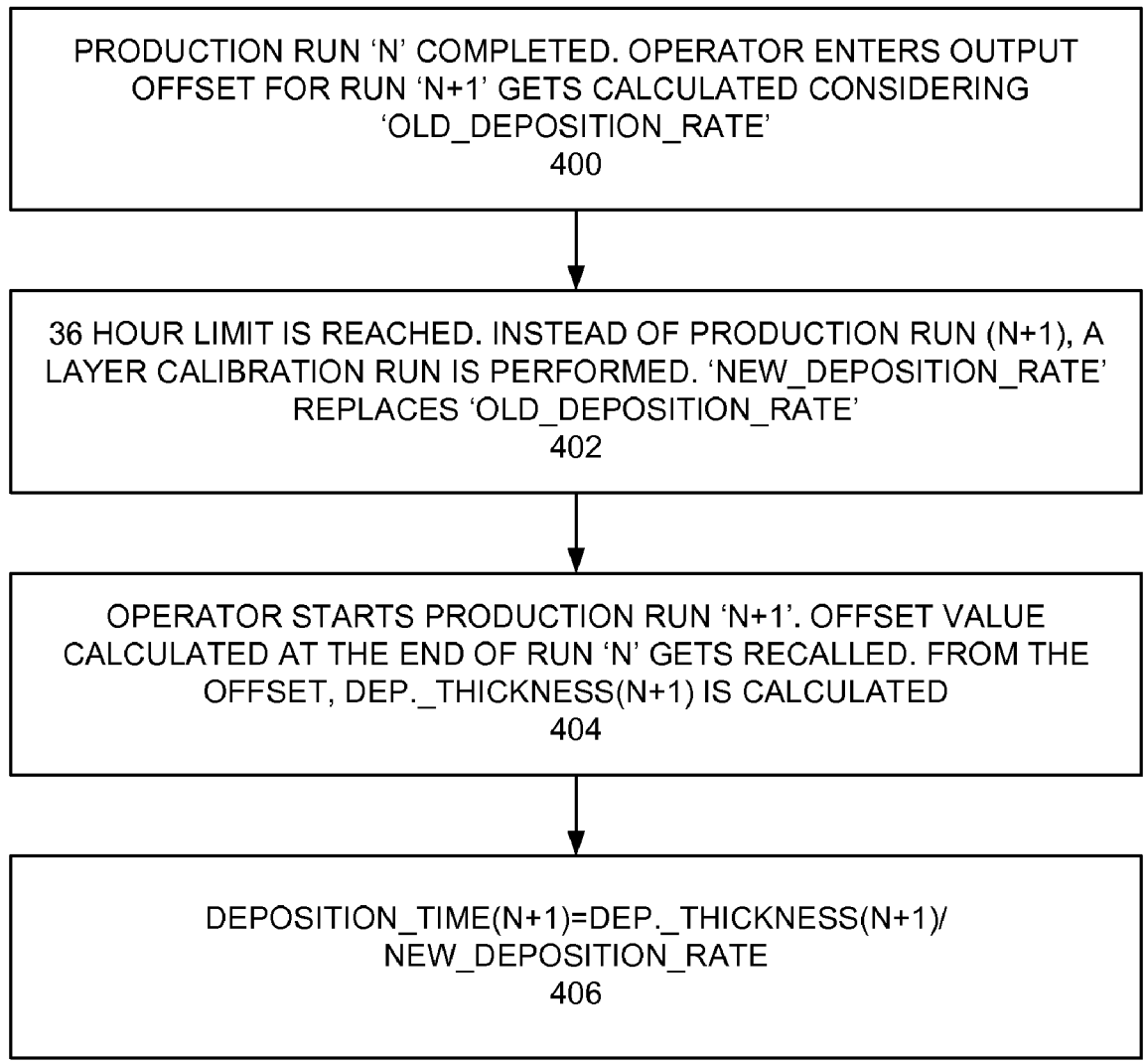

Referring now to FIG. 4, example operations to account for layer calibrations are shown for the basic algorithm. Because the deposition rate is not constant, it is calibrated at regular intervals of time, for example, every 36 hours. Changes in the deposition rates after layer calibration are not negligible. One may distinguish between the deposition rates before and after layer calibrations as Deposition Rate$_{(old)}$ and Deposition Rate$_{(new)}$. Since after a layer calibration, Deposition Rate$_{(new)}$ is enforced, the above step 'c' in the tuning algorithm becomes:

$$\text{Deposition Time}_{(n+1)} = \text{Deposition Thickness}_{(n+1)}/\text{Deposition Rate}_{(new)}$$

FIG. 4 shows the effect of layer calibration on the tuning equations. Depending upon the difference between Deposition Rate$_{(new)}$ & Deposition Rate$_{(old)}$, this deposition time calculated after a layer calibration can be substantially different from the deposition time that was to be enforced by the tuner. As indicated at a block 400, production run 'N' is completed, the operator enters output, and Output Offset$_{(n+1)}$ is calculated considering the old deposition rate. When the 36 hour limit is reached, instead of production run (N+1), a layer calibration run is performed and the new deposition rate replaces the old deposition rate as indicated at a block 402. The operator starts production run (N+1), the offset value calculated at the end of run 'N' is recalled. From the offset, deposition thickness (N+1) is calculated as indicated at a block 404. Then the deposition time (N+1) is calculated using the calculated deposition thickness (N+1) and the new deposition rate as indicated at a block 406. While this technique for layer calibration tuning can keep the thickness constant, the output can be observed to change substantially based on the drastic change in the deposition time. For example, after a layer calibration run is performed, which changes the deposition rate and consequently the deposition time drastically, with a sudden increase in the deposition time, the retentivity magnetic property also increased significantly. Thus immediately after the layer calibrations, due to the change in the deposition rate, the deposition thickness often can be different than the one intended.

Thus, although there is a strong correlation between deposition thickness and the magnetic properties, when both the components of the deposition thickness change, the magnetic properties tend to get affected more by the deposition time. Therefore, it is necessary to account this phenomenon in the tuning algorithm. In order to take into account the change in the deposition rate after layer calibrations, one might be tempted to merely replace the Dep. Rate by Dep. Rate$_{(new)}$ in the algorithm $$\text{Deposition Time}_{(n+1)} = \text{Deposition Thickness}_{(n+1)}/\text{Deposition Rate}_{(new)}$$

However, that way, this creates a problem as it does not make sense to compare the Deposition Time$_{(n+1)}$ with the deposition time used for the layer calibration run. One needs to compare the new deposition time with the deposition time utilized in the latest production run. Saving and extracting a value used in a prior run would be an even more complicated task.

Ultimately, one needs to ensure that the deposition time for the production run immediately after the layer calibration run, would be same as the Deposition Time$_{(n+1)}$ calculated after the prior production run, either with or without enforcement of MTA. In order to ensure this, the offset for the production run after layer calibration is calculated based on the Deposition Time$_{(n+1)}$ calculated after the prior production run.

To achieve this, an additional algorithm is added after a layer calibration run as follows:

Deposition Time$_{(After\ Previous\ Production\ Run)}$=(Target Output−Output Offset$_{(After\ Previous\ Production\ Run)}$/ Slope)/Deposition Rate$_{(old)}$ Deposition Rate$_{(new)}$=Deposition Thickness$_{(Single\ Layer\ Calibration)}$/Deposition Time$_{(Single\ Layer\ Calibration)}$ Output Offset$_{(Next\ Production\ Run)}$=Target Output− (Slope*Dep. Rate$_{(new)}$*Dep. Time$_{(After\ Previous\ Production\ Run)}$))

Figure 5:
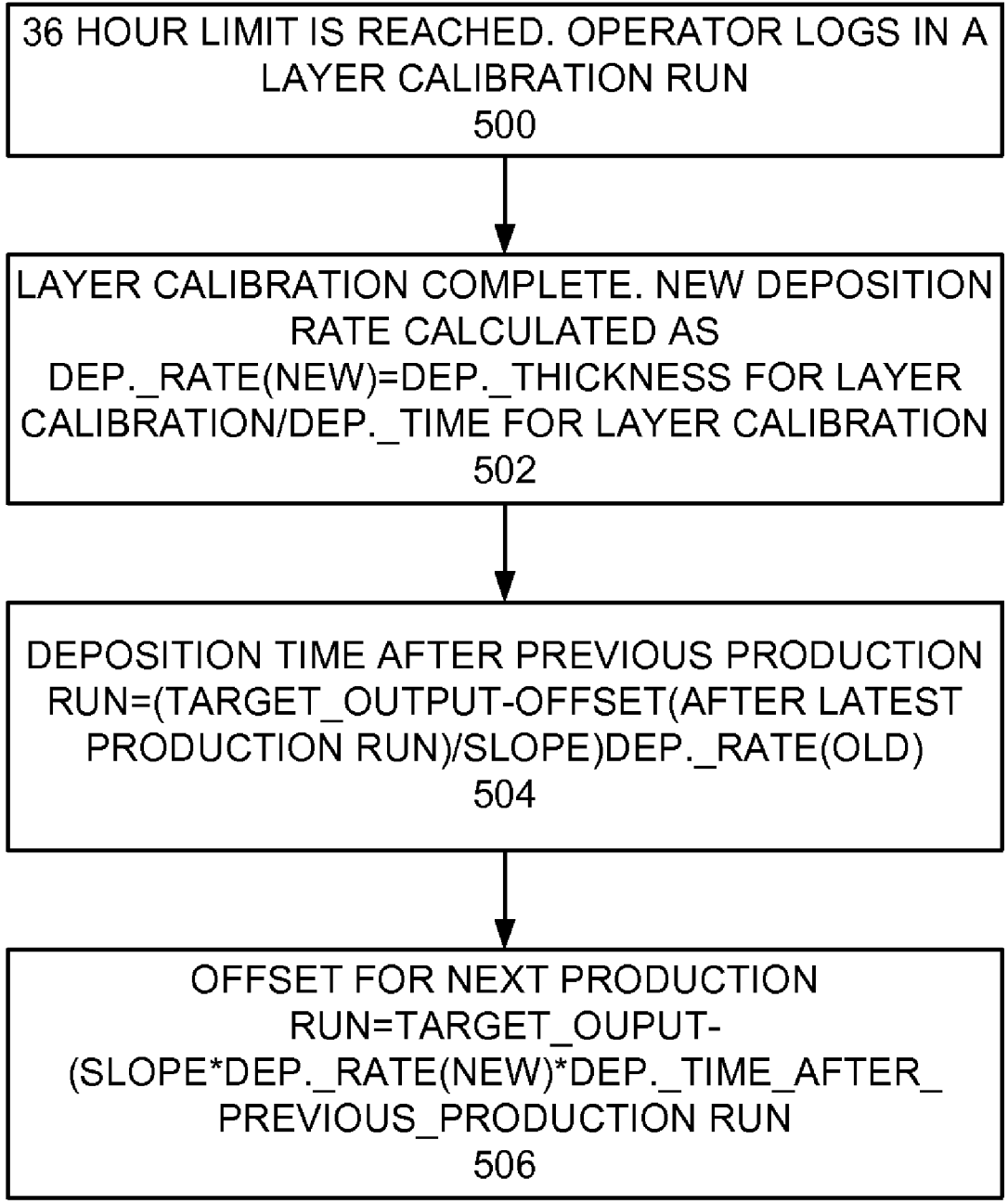
Figure 6:
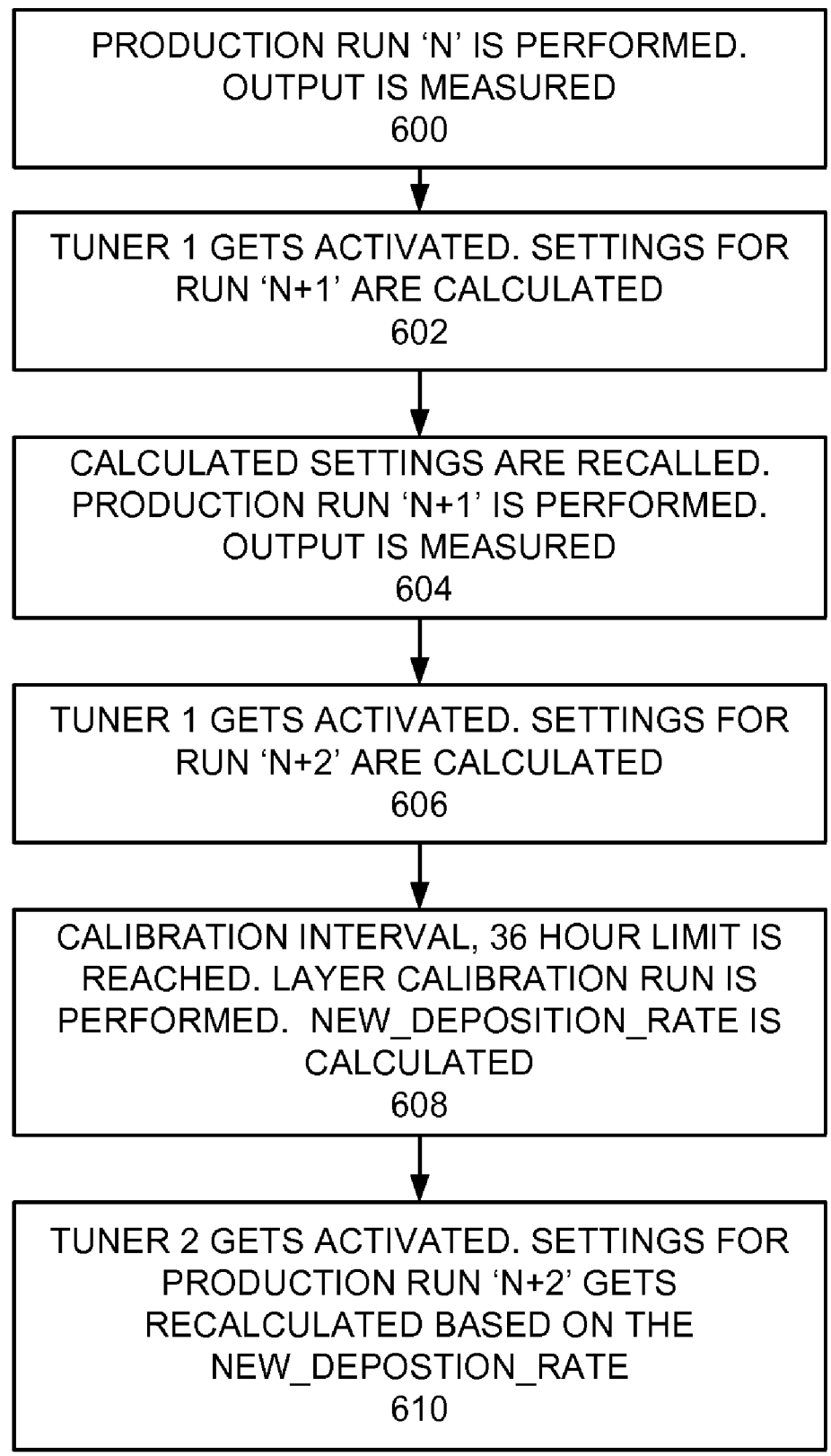

Referring now to FIGS. 5 and 6, example operations are shown for the sequential segmented interleaving (SSI) algorithm in accordance with the invention.

FIG. 5 illustrates an algorithm after layer calibration to account for the change in deposition rate starting at a block 500 where the predetermined time interval, for example, 36 hour limit is reached, and the operator logs in a layer calibration run. As indicated at a block 502, the layer calibration is complete, and a new deposition rate is calculated with the thickness for layer calibration divided by the deposition time for the layer calibration.

The deposition time after previous production run is calculated as indicated at a block 504 as follows:

Deposition Time$_{(After\ Previous\ Production\ Run)}$=(Target Output−Output Offset$_{(After\ Previous\ Production\ Run)}$/ Slope)/Deposition Rate$_{(old)}$.

Then the Offset for the next production run is calculated as indicated at a block 506 as follows:

Output Offset$_{(Next\ Production\ Run)}$=Target Output− (Slope*Dep. Rate$_{(new)}$*Dep. Time$_{(After\ Previous\ Production\ Run)}$)).

Summary of the SSI Algorithm Implementation

FIG. 6 illustrates the complete sequential segmented interleaving (SSI) algorithm in accordance with the invention. The SSI algorithm achieves an effective run-to-run process control with two sequential tuning algorithms running one after the other.

As indicated at a block 600, a production run 'N' is performed, and output is measured. A first tuner is activated and setting for run 'N+1' are calculated as indicated at a block 602. The calculated settings at block 602 implement the illustrated algorithm of FIG. 3 as described above, and are provided after each production run. The calculated settings at block 602 are recalled and a next production run 'N+1' is performed, and output is measured as indicated at a block 604. The first tuner is activated and setting for run 'N+2' are calculated as indicated at a block 606. A calibration interval, such as the example 36 hour limit is reached, a calibration run is performed and a new deposition rate is calculated as indicated at a block 608. Next a second tuner is activated and setting for run 'N+2' are recalculated based upon the new deposition rate as indicated at a block 610. The calculated settings at block 610 implement the illustrated algorithm of FIG. 5 as described above recalculating the offset for the next production run based on the deposition time calculated after the previous production run and the new Deposition Rate, and are provided after each layer calibration run.

Adding the additional tuner logic or tuner 2 at block 610 only after the layer calibrations allows one to make sure that the tuner treats the deposition rate as constant between layer calibrations, which it is, and this also acknowledges the change in deposition rate after layer calibrations.

The sequential segmented interleaving (SSI) algorithm has been implemented for one hard bias process recipe on two tools, and process performance for that recipe after implementation of the algorithm was compared with the process performance before implementation. Output determining the quality in this hard bias process recipe is Sheet Resistance, and the distribution of the Sheet Rho before and after implementation of the SSI algorithm were compared. For both the tools, mean centering shows improvement after implementation of the algorithm. Process variation has also reduced as shown by the reduced standard deviation values. Most importantly, process capability (Cpk) shows impressive improvement for both the tools.

Referring now to FIG. 7, an article of manufacture or a computer program product 700 of the invention is illustrated. The computer program product 700 includes a computer readable recording medium 702, such as, a floppy disk, a high capacity read only memory in the form of an optically read compact disk or CD-ROM, a tape, or another similar computer program product. Computer readable recording medium 702 stores program means or control code 704, 706, 708, 710 on the medium 702 for carrying out the methods for implementing Advanced Process Control (APC) for enhanced magnetic properties process output control using a sequential segmented interleaving algorithm of the invention in the system 100 of FIG. 1.

A sequence of program instructions or a logical assembly of one or more interrelated modules defined by the recorded program means or control code 704, 706, 708, 710, direct the system 100 for implementing Advanced Process Control (APC) for enhanced magnetic properties process output control using a sequential segmented interleaving algorithm of the invention.

While the present invention has been described with reference to the details of the embodiments of the invention shown in the drawing, these details are not intended to limit the scope of the invention as claimed in the appended claims.

What is claimed is:

1. A method for implementing Advanced Process Control (APC) of a fabrication tool for enhanced electrical, magnetic, or physical properties process output control comprising:

using a sequential segmented interleaving algorithm with two tuning equations running in parallel; and calculating a deposition time after a production run based upon a relationship between at least one process output and a current deposition time process input and said calculated deposition time based upon an output offset including an identified deposition thickness offset; and comparing said calculated deposition time with said current deposition time plus a maximum time adjustment and comparing said calculated deposition time with said current deposition time minus said maximum time adjustment;

responsive to said calculated deposition time being greater than said current deposition time plus said maximum time adjustment; said calculated deposition time being set to said deposition time plus said maximum time adjustment;

responsive to said calculated deposition time being less than said current deposition time minus said maximum time adjustment; said calculated deposition time being set to said current deposition time minus said maximum time adjustment;

responsive to said calculated deposition time being between said current deposition time plus said maximum time adjustment and said current deposition time minus said maximum time adjustment, said calculated deposition time being set to said calculated deposition time;

calculating a deposition rate offset value after a calibration run based upon the relationship between a calibration deposition thickness process output and an updated deposition time process input calculated after a last production run, said calculated deposition rate offset value including a deposition time for said calibration run;

storing said calculated deposition rate offset value; and applying said set calculated deposition time to the fabrication tool for a next production run.

2. The method as recited in claim 1 wherein calculating a deposition time after a production run based upon a relationship between the at least one process output and a current deposition time process input includes identifying said output offset represented by $$\text{Output Offset}_{(n+1)} = \text{Actual Output}_{(n)} - (\text{Slope} * \text{Deposition Rate} * \text{Deposition Time}_{(n)})$$

where Slope represents a constant value based upon a relationship between the magnetic properties process output and deposition thickness identified using predefined collected data, n represent a production run, and n+1 represents a next production run.

3. The method as recited in claim 2 includes identifying said deposition thickness represented by $$\text{Deposition Thickness}_{(n+1)} = (\text{Target Output} - \text{Output Offset}_{(n+1)})/\text{Slope}$$

where Target Output represents a desired process output.

4. The method as recited in claim 3 wherein the calculated deposition time after a production run is represented by $$\text{Deposition Time}_{(n+1)} = \text{Deposition Thickness}_{(n+1)}/\text{Deposition Rate}.$$

5. The method as recited in claim 4 wherein the calculated deposition time is limited by said maximum time adjustment (MTA), whereby Deposition Time $_{(n+1)}$ is limited in a range represented by $$\text{Deposition Time}_{(n+1)} = \text{Deposition Time}_{(n)} - \text{MTA, and Deposition Time}_{(n)} + \text{MTA}.$$

6. The method as recited in claim 1 wherein calculating a deposition rate offset value after a calibration run based upon the relationship between a calibration deposition thickness process output and an updated deposition time process input calculated after a last production run includes identifying an output offset for a next production run represented by $$\text{Output Offset}_{(Next\ Production\ Run)} = \text{Target Output} - (\text{Slope} * \text{Deposition Rate}_{(new)} * \text{Deposition Time}_{(After\ Previous\ Production\ Run)})$$

where Target Output represents a desired process output, where Slope represents a constant value based upon a relationship between the magnetic properties process output and deposition thickness identified using predefined collected data and where Deposition Rate $_{(new)}$ is identified by the calibration deposition thickness process output.

7. The method as recited in claim 6 wherein the Deposition Rate $_{(new)}$ is represented by $$\text{Deposition Rate}_{(new)} = \text{Deposition Thickness}_{(Single\ Layer\ Calibration)}/\text{Deposition Time}_{(Single\ Layer\ Calibration)}.$$

8. The method as recited in claim 6 wherein the Deposition Time $_{(After\ Previous\ Production\ Run)}$ is represented by $$\text{Deposition Time}_{(After\ Previous\ Production\ Run)} = (\text{Target Output} - \text{Output Offset}_{(After\ Previous\ Production\ Run)}/\text{Slope})/\text{Deposition Rate}_{(old)}.$$

9. An apparatus for implementing Advanced Process Control (APC) of a fabrication tool for enhanced magnetic properties process output control comprising:

a fabrication process tool controller implementing a sequential segmented interleaving algorithm with two tuning equations running in parallel; and said fabrication process tool controller calculating a deposition time after a production run based upon a relationship between a magnetic properties process output and a current deposition time process input; and said calculated deposition time based upon an output offset including an identified deposition thickness offset; and comparing said calculated deposition time with said current deposition time plus a maximum time adjustment and comparing said calculated deposition time with said current deposition time minus said maximum time adjustment;

said fabrication process tool controller, responsive to said calculated deposition time being greater than said current deposition time plus said maximum time adjustment; setting said calculated deposition time to said deposition time plus said maximum time adjustment;

said fabrication process tool controller, responsive o said calculated deposition time being less than said current deposition time minus said maximum time adjustment; setting said calculated deposition time to said current deposition time minus said maximum time adjustment;

said fabrication process tool controller, responsive to said calculated deposition time being between said current deposition time plus said maximum time adjustment and said current deposition time minus said maximum time adjustment, setting said calculated deposition time to said calculated deposition time;

said fabrication process tool controller calculating a deposition rate offset value after a calibration run based upon the relationship between a calibration deposition thickness process output and an updated deposition time process input calculated after a last production run, said calculated deposition rate offset value including a deposition time for said calibration run;

said fabrication process tool controller storing said calculated deposition rate offset value; and said fabrication process tool controller applying said set calculated deposition time to the fabrication tool for a next production run.

10. The apparatus as recited in claim 9, includes control code stored on a non-transitory computer readable medium, and wherein said fabrication process tool controller uses said control code for implementing said sequential segmented interleaving algorithm with two tuning equations running in parallel.

11. The apparatus as recited in claim 9, wherein said fabrication process tool controller calculating a deposition time after a production run based upon a relationship between the magnetic properties process output and a current deposition time process input includes said fabrication process tool controller identifying said output offset represented by $$\text{Output Offset}_{(n+1)} = \text{Actual Output}_{(n)} - (\text{Slope} * \text{Deposition Rate} * \text{Deposition Time}_{(n)})$$

where Slope represents a constant value based upon a relationship between the magnetic properties process output and deposition thickness identified using predefined collected data, n represent a production run, and n+1 represents a next production run.

12. The apparatus as recited in claim 11, includes said fabrication process tool controller identifying a deposition thickness represented by $$\text{Deposition Thickness}_{(n+1)} = (\text{Target Output} - \text{Output Offset}_{(n+1)})/\text{Slope}$$

where Target Output represents a desired process output.

13. The apparatus as recited in claim 12, wherein the calculated deposition time after a production run is represented by $$\text{Deposition Time}_{(n+1)} = \text{Deposition Thickness}_{(n+1)}/\text{Deposition Rate}.$$

14. The apparatus as recited in claim 13, wherein the calculated deposition time is limited by said maximum time adjustment (MTA), whereby Deposition Time $_{(n+1)}$ is limited in a range represented by $$\text{Deposition Time}_{(n+1)} = \text{Deposition Time}_{(n)} - \text{MTA, and Deposition Time}_{(n)} + \text{MTA}.$$

15. The apparatus as recited in claim 9, wherein said fabrication process tool controller calculating a deposition rate offset value after a calibration run based upon the relationship between a calibration deposition thickness process output and an updated deposition time process input calculated after a last production includes said fabrication process tool controller identifying an output offset for a next production run represented by $$\text{Output Offset}_{(Next\ Production\ Run)} = \text{Target Output} - (\text{Slope} * \text{Deposition Rate}_{(new)} * \text{Deposition Time}_{(After\ Previous\ Production\ Run)})$$

where Target Output represents a desired process output, where Slope represents a constant value based upon a relationship between the magnetic properties process output and deposition thickness identified using predefined collected data and where Deposition Rate $_{(new)}$ is identified by the calibration deposition thickness process output.

16. The apparatus as recited in claim 15 wherein the Deposition Rate $_{(new)}$ is represented by $$\text{Deposition Rate}_{(new)} = \text{Deposition Thickness}_{(Single\ Layer\ Calibration)}/\text{Deposition Time}_{(Single\ Layer\ Calibration)}.$$

17. The apparatus as recited in claim 9, wherein the Deposition Time $_{(After\ Previous\ Production\ Run)}$ is represented by $$\text{Deposition Time}_{(After\ Previous\ Production\ Run)} = (\text{Target Output} - \text{Output Offset}_{(After\ Previous\ Production\ Run)}/\text{Slope})/\text{Deposition Rate}_{(old)}.$$

18. A system for implementing Advanced Process Control (APC) of a fabrication tool for enhanced electrical, magnetic, or physical properties process output control comprising:
a processor;
a control code stored on a computer readable medium, said control code including a sequential segmented interleaving algorithm with two tuning equations running in parallel;
a fabrication process tool controller implementing said sequential segmented interleaving algorithm with two tuning equations running in parallel; and
said fabrication process tool controller calculating a deposition time after a production run based upon a relationship between a magnetic properties process output and a current deposition time process input; and said calculated deposition time based upon an output offset including an identified deposition thickness offset; and
comparing said calculated deposition time with said current deposition time plus a maximum time adjustment and comparing said calculated deposition time with said current deposition time minus said maximum time adjustment;
said fabrication process tool controller, responsive to said calculated deposition time being greater than said current deposition time plus said maximum time adjustment; setting said calculated deposition time to said deposition time plus said maximum time adjustment;
said fabrication process tool controller, responsive o said calculated deposition time being less than said current deposition time minus said maximum time adjustment; setting said calculated deposition time to said current deposition time minus said maximum time adjustment;
said fabrication process tool controller, responsive to said calculated deposition time being between said current deposition time plus said maximum time adjustment and said current deposition time minus said maximum time adjustment, setting said calculated deposition time to said calculated deposition time;
said fabrication process tool controller calculating a deposition rate offset value after a calibration run based upon the relationship between a calibration deposition thickness process output and an updated deposition time process input calculated after a last production run, said calculated deposition rate offset value including a deposition time for said calibration run;
said fabrication process tool controller storing said calculated deposition rate offset value; and
said fabrication process tool controller applying said set calculated deposition time to the fabrication tool for a next production run.

19. The system as recited in claim 18, includes said fabrication process tool controller periodically implementing said calibration run after a predefined time interval.

20. The system as recited in claim 18, includes said fabrication process tool controller identifying an output offset used for calculating said deposition time; and said output offset represented by $$\text{Output Offset}_{(n+1)} = \text{Actual Output}_{(n)} - (\text{Slope} * \text{Deposition Rate} * \text{Deposition Time}_{(n)})$$

where Slope represents a constant value based upon a relationship between the electrical, magnetic, or physical properties process output and deposition thickness identified using predefined collected data identified using predefined collected data, n represent a production run, and n+1 represents a next production run.

* * * * *